Nov. 13, 1945.   S. S. MATTHES   2,388,860
TROLLEY WIRE HANGER
Filed Sept. 28, 1943
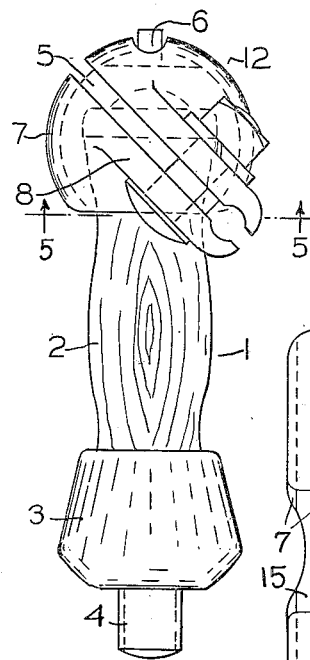
FIG. 1
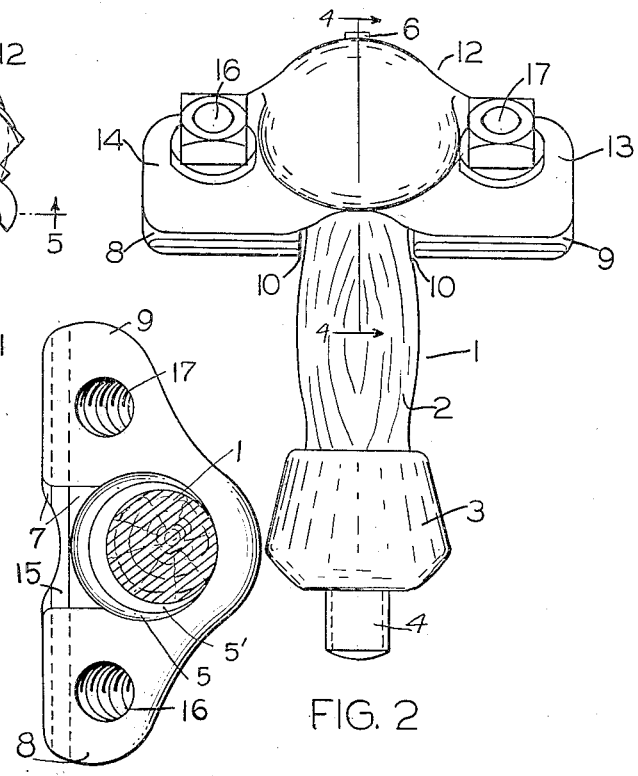
FIG. 2
FIG. 5
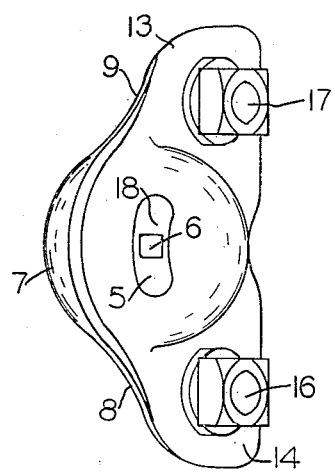
FIG. 3
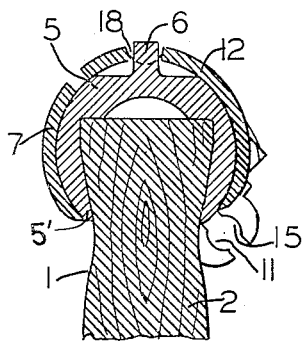
FIG. 4
Inventor
SAMUEL S. MATTHES
By Alfred F. Dees
Attorney Patented Nov. 13, 1945

2,388,860

UNITED STATES PATENT OFFICE 2,388,860

TROLLEY WIRE HANGER

Samuel S. Matthes, Mansfield, Ohio, assignor to The Ohio Brass Company, Mansfield, Ohio, a corporation of New Jersey Application September 28, 1943, Serial No. 504,195

6 Claims. (Cl. 174—160)

This invention relates to trolley wire hangers and in its more specific aspects is directed to a hanger adapted to decrease the distance between the span wire and trolley wire.

The object of this invention is to provide an adjustable trolley wire hanger that is adapted to place the trolley wire closer to the span wire from which it is suspended.

Another object of the invention is to provide a trolley wire hanger body one of whose ends is spherical and in which the clamp portion of the hanger fits about the spherical end to provide for the adjustment of the clamp relatively of the longitudinal axis of the hanger.

A further object of the invention is to provide a trolley wire hanger having a spherical connection between the clamp and body and in which the adjusting movement of the clamp is restricted to a single plane parallel to the longitudinal axis of the body.

A further object is to provide trolley wire hanger clamping members which have a maximum of contact with the element on which they are adjustably mounted.

A still further object of the invention is to provide a spherical headed trolley wire hanger whose clamp portion fits a complementary socket of the wire clamp, the latter adjustable in a single plane and which is constructed in a manner to reduce the space between the span wire and the trolley wire.

Other and further objects of the invention will occur to those skilled in the arts to which this invention pertains as the description proceeds which taken in connection with the accompanying drawing sets forth a preferred embodiment of the invention but such disclosure is not to be construed as a limitation of the invention which is limited only by the appended claims and any and all modifications, alterations and variations of structure coming within the spirit and scope thereof are deemed to be included herein.

In the drawing:

Fig. 1 shows an elevational view of the improved trolley hanger.

Fig. 2 shows an elevational view of the hanger rotated 90-degrees from that of Fig. 1.

Fig. 3 shows a top plan view of the hanger.

Fig. 4 is a section view taken along the line 4—4 of Fig. 2.

Fig. 5 is a bottom plan view of the hanger in partial section taken on the line 5—5 of Fig. 1.

Prior art trolley wire hangers within the limits of their construction have been arranged between the trolley wire and the span wire such that the length of the hanger was determinative of the spacing between the two. For certain installations it is desirable and necessary to have the span wire and trolley wire closer together and therefore the invention and development of other expedients has been a long-felt want. In many instances shortening the overall length of the hanger failed to accomplish the desired result. The instant case sets forth a disclosure for securing the necessary adjustment between span wire and trolley wire and which positions the two closer together.

The hanger comprises initially a body element 1, including an insulating element 2, which is preferably made of some tough highly seasoned and treated wood such as hickory. The insulating element 2 has a fitting 3 secured thereon at one end in a well-known manner. A stud 4 extends from the same or lower end of the body 1 and also extends through the fitting 3. The elements 3 and 4 are intended to receive and support an ear element (not shown) adapted to receive and hold a trolley wire as is customary in the art.

The upper end of the insulating element 2, as shown in the drawing, has a spherical end fitting or element 5 secured thereon in the customary manner. This spherical head is flattened at its closed end and has a projection 6 extending therefrom which is disposed substantially coaxially with the longitudinal axis of the body member 1.

The clamp portion of the hanger is fitted about the spherical end fitting 5 on the body member 1, and grips the solid fitting 5 with no intervening parts. The clamp comprises a lower wire clamping member 7 having wing elements 8 and 9 that extend from either side thereof. The center portion of the member 7 is socketed and intended to be received on the lower side of the spherical element 5. Opposite the spherical socket 7 and between the inner ends of the wings 8 and 9 a slot 10 is provided through which the wood stick 2 is passed in assembling. The clamping element 7 is faced off at 45-degrees as shown and the lowermost edge of the wings 8 and 9 have a non-continuous wire receiving groove 11 formed thereon in order to lower the edge as much as possible. The normal locking movement of this element when installed is upward against the lower side of the spherical element 5.

The upper wire clamping portion of the clamp comprises a member 12 having a central spherical socket portion adapted to fit over the spherical end element 5. This member has wing elements 13 and 14 complemental to wing portions 8 and 9. The lowermost edges of the clamping member wing elements are formed into a wire receiving groove 15 adapted to receive a span wire. The two members 7 and 12 and their grooves 11 and 15 formed in one of the edges thereof constitute the only wire holding elements. Relative axial movement between members 7 and 12 for the purpose of accomplishing a clamping of the wire receivable between grooves 11 and 15 is effected by loosening a pair of nut, bolt and washer elements 16 and 17 that extend through appropriate apertures in the wing elements of each of the members 7 and 12, of the clamp. The cooperating spherical surfaces between parts 5, 7 and 12 permit of axial rotation of the body member 1 until the parts 7 and 12 are clamped onto the spherical head 5. The clamping member 12 has a slot 18 therein adapted to receive projection 6. This slot is intended to confine the adjusting movement of the clamping members 7 and 12 to a single path that is substantially parallel to a plane through the axis of the body element 1 and in the plane of the wire receiving grooves 11 and 15 parallel to the longitudinal axis of the body element 1. Any universal motion of the clamp relative to the spherical end fitting 5 is prevented and is restricted to a single plane by the said projection. The provision of this projection enables the adjustment of the body with respect to the span wire in a more expeditive manner.

In Fig. 5 an opposite view is shown from Fig. 3 in which the extreme edge or rim 5' of the spherical head 5 is shown as tightly contacting the member 1 and a small exposed portion of the spherical head 5 is also shown; the clearance of the member 2 relative of the clamping member 7, permitting relative movement, is indicated between the darts.

The clamping element 12 is faced off at 45-degrees complemental to the wire supporting element 7. By this arrangement a greater area of the sphere is employed thereby better enabling an adjustment of the parts. Body member 1 is always vertically disposed and the clamps are adjustable relative thereto such that the vertical body position will be obtained irrespective of the slant or angle of the span wire with respect to the horizontal. The angular facing of the parts also provides for the lowering of the wire grooves 11 and 15 and the steeper the angle the lower the position of the wire grooves.

The two bolts 16 and 17 clamp the elements 7 and 12 against the spherical head 5 simultaneously with the clamping of the wire to thereby assure a rigid immovable joint following adjustment. The load on the hanger is taken primarily by the clamping member 12 which has the substantially continuous groove 15.

That which is regarded new, novel and useful and which is sought to be protected by Letters Patent of the United States is as follows:

1. In a trolley wire hanger, in combination, a body member having a spherical head on one end thereof and supporting means at the other end, a wire clamping element having a non-continuous wire receiving groove formed therein and disposed below the center of the spherical head, a second wire clamping element having a socket fitting the spherical head and provided with a wire receiving groove cooperating with the first said receiving groove, means to simultaneously draw the clamping elements into secure engagement with a supporting wire and with the spherical head, and means on the spherical head cooperating with a slot in one of the clamping elements to restrict the movement of the clamping elements to a path parallel to a vertical plane through the grooves, the clamping elements being so constructed and arranged relative to the spherical head that the socket portion of each clamping element will clamp onto only the spherical head and the supporting wire will be gripped only by the clamping elements.

2. In a trolley wire hanger, in combination, a body member having a spherical head at one end and an axial stud at the other end, a clamp adjustably mounted on the spherical head and enclosing the head, the clamp comprising a wire clamping element for the body member having a socket cooperating only with said head and a groove formed in said element to receive a supporting wire, a second wire clamping element having a socket cooperating only with the spherical head and also having a groove formed in said second element and cooperating with the first said groove to receive the supporting wire, the wire receiving grooves disposed to one side of and below the center of said spherical head whereby the supporting wire will be gripped only by the clamping elements, means to draw the clamping elements into secure engagement with the said supporting wire and draw the socket portions of the clamping elements into secure engagement with the spherical head.

3. In a trolley wire hanger, in combination, a body member having a spherical head at one end and an axial stud on the other end, a wire clamping element having a socket engageable with the said head and also having projecting wings, one face of the clamping element positioned in a plane obliquely disposed to the longitudinal axis of the body member, one edge of the clamping element wings formed with a wire receiving groove, a second wire clamping element having a socket engageable with the said head and also having projecting wings, one face of the second clamping element positioned in a plane corresponding to the first said plane and having one edge of its wings formed with a wire receiving groove, said grooves cooperating to receive a supporting wire for the hanger, the said grooves being so disposed relative to the body member as to hold the supporting wire below the center of its spherical head and to the side of the body member, the clamping elements being the only holding means for the supporting wire, the socket portions being the only holding means between the clamping elements and the spherical head, means to restrain the lateral adjustment of the wire receiving grooves relative to the body member to a single path of movement, and means to bias the clamping elements toward each other and into engagement with the said head and supporting wire.

4. In a hanger to support a trolley wire from a span wire, in combination, a body member having a substantially spherical head at one end thereof, said head having a projection thereon coaxial with the longitudinal axis of its body member, means to clasp the span wire and hold it below the center of the said head, the said means comprising separate members each having a socket portion with a spherical surface to receive and enclose the spherical head, the said means having cooperating wire receiving grooves, the said means adjustable relative to the body member and having a slot in one of its members in which said projection is positioned to confine the adjustment of the means relative to the spherical head to a single lateral movement, the adjacent faces of the separate members of the clamping means being disposed in parallel planes obliquely disposed to the axis of the body member, the said socket portions being the only means of engagement with the spherical head and the wire receiving grooves the only receiving means for the supporting wire, and means to draw the members of the clamping means onto the spherical head and onto the supporting wire.

5. A supporting clamp for the spherical head of a body member of a trolley hanger, comprising a pair of clamping members having adjacent spaced faces and each member having a cup-shaped portion cooperating with the other cup-shaped portion to form a socket with a spherical inner surface, one clamping member having an opening into the socket and through which the body member of the hanger may project with the spherical head within the socket, two pairs of wings projecting laterally from the spherical portion, one wing of each pair associated with each clamping member, a groove formed in each wing adjacent one edge thereof, the grooves in the wings of each pair cooperating to form a wire receiving groove and the wire receiving grooves of the wings arranged in alignment to receive a supporting wire or cable, the said wings being disposed in planes obliquely disposed to an axis through the said opening and the center of curvature of the spherical surface of the socket whereby the edges of the wings wherein the said grooves are formed and the said grooves will project below the center of the socket and to one side of the socket such that the supporting cable will be held adjacent the lower edge of the socket, and means associated with each pair of wings to draw the socket members and the wings into engagement with the head of the hanger body and the supporting cable respectively.

6. Means to support a body member having a spherical head at one end and means to support a trolley wire at the other end, the first said means comprising a span wire clamping means comprising a pair of members, each member having a center portion cooperating with the other center portion and forming a socket recess having a spherical surface conforming to the spherical surface on the said head, an opening in one clamping member extending into the socket recess to receive the body member with the spherical head enclosed within the recess in relatively adjustable relation, a wing projecting from opposite sides of the center portion of each clamping member, the wings from one clamping member cooperating with the wings of the other clamping member, the said wings being disposed in parallel planes obliquely disposed to the axis of said opening and the center of the socket recess whereby the lower outer longitudinal edge of the wings will project laterally from the lower edge of the central portion of the lower clamping member, transversely disposed cooperating grooves formed in the adjacent faces of the wings along the said outer edges thereof to form aligned wire receiving and retaining grooves for the said span wire whereby the span wire will be held only by the wings, and means associated with the wings on opposite sides of the central portion to secure the clamping member to the said spherical head and to the span wire.

SAMUEL S. MATTHES.